Oct. 9, 1956
A. M. BRENNEKE
2,766,086
PISTON RING
Filed Feb. 23, 1952
4 Sheets-Sheet 1
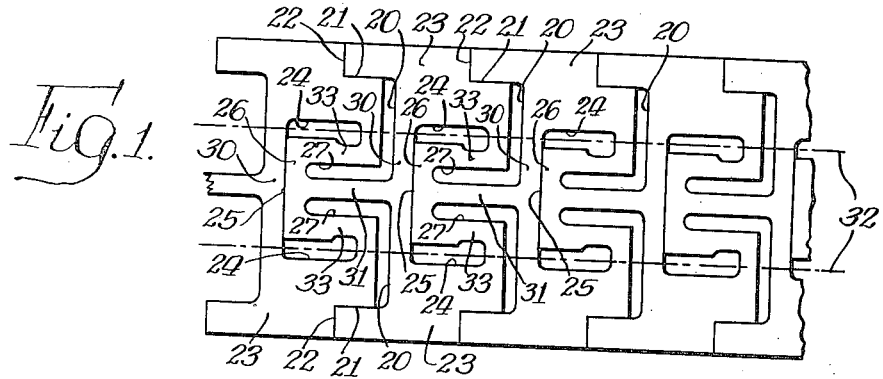
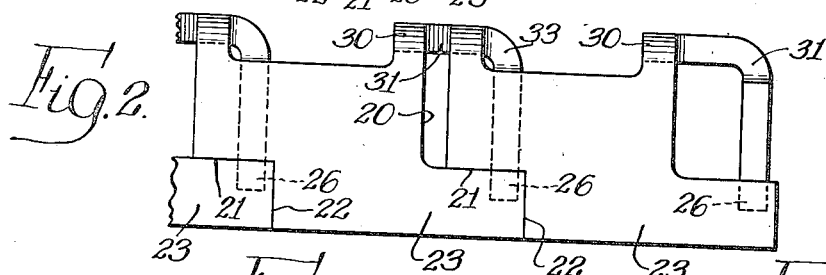
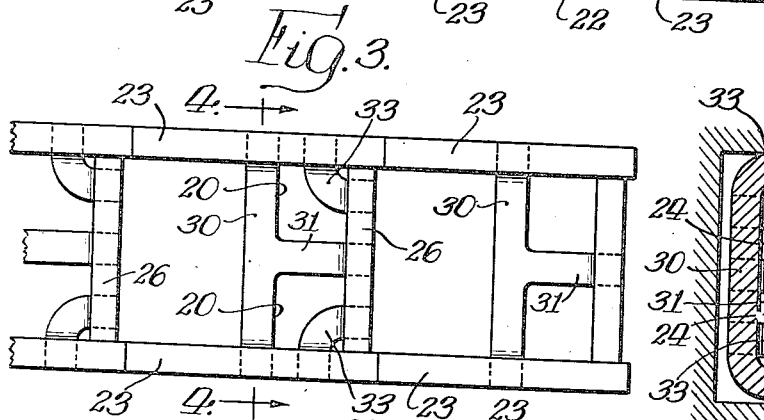
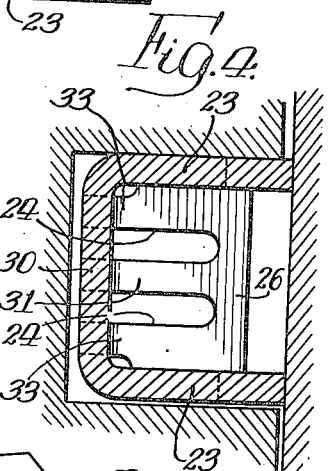
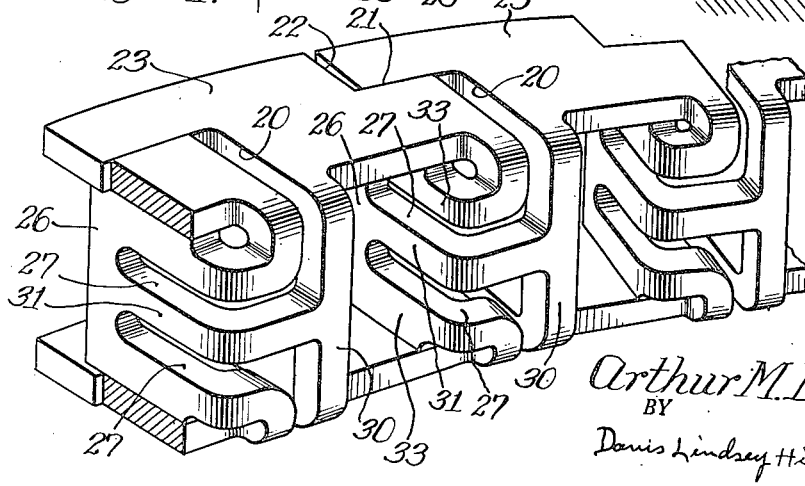
INVENTOR.
Arthur M. Brenneke,
BY
Davis Lindsey Hibben & Noyes
Attys.

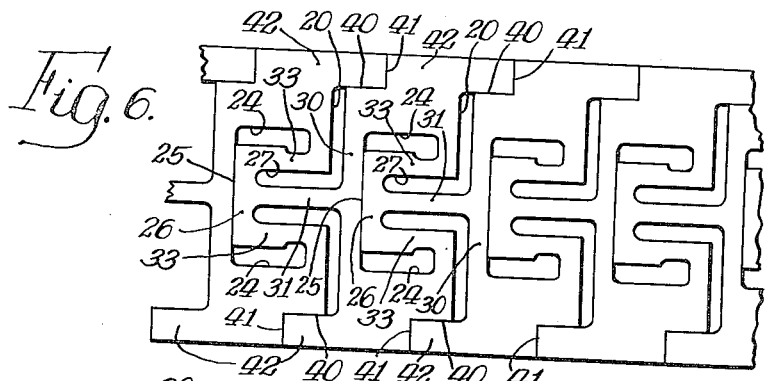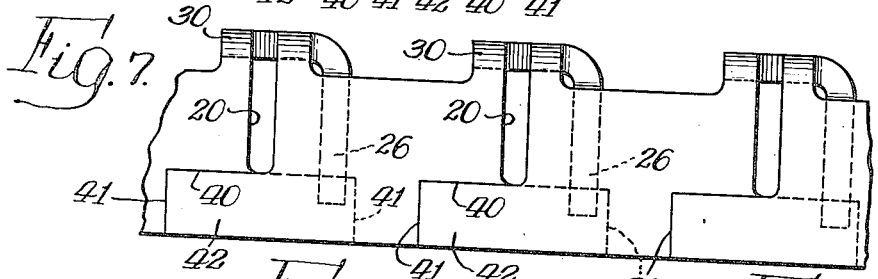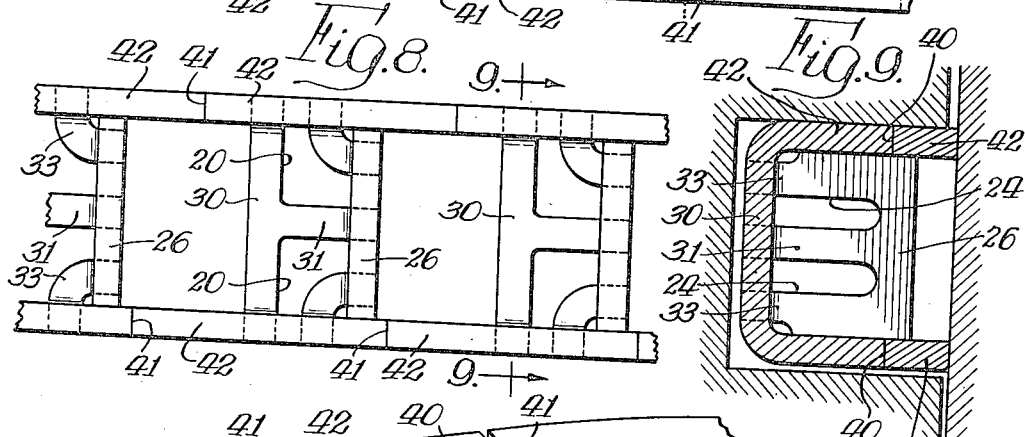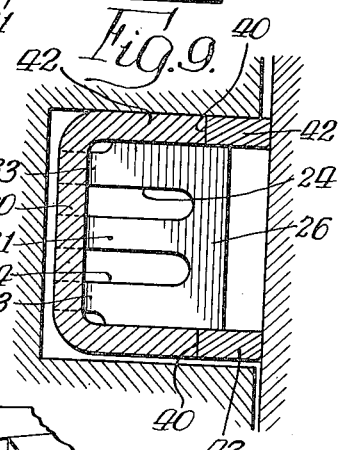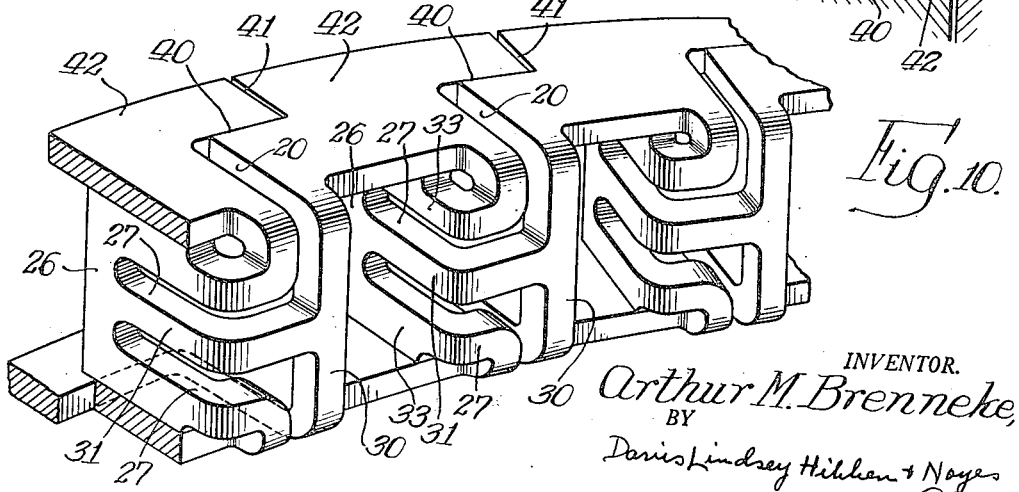

Oct. 9, 1956　　　　　A. M. BRENNEKE　　　　2,766,086
PISTON RING
Filed Feb. 23, 1952　　　　　　　　　　　　4 Sheets-Sheet 3
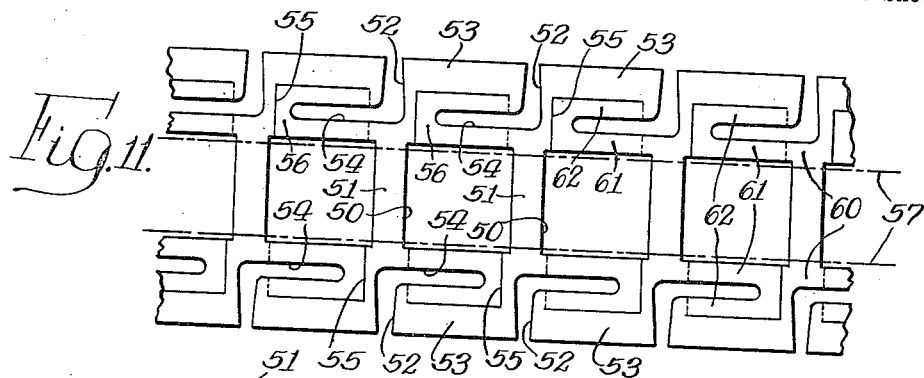
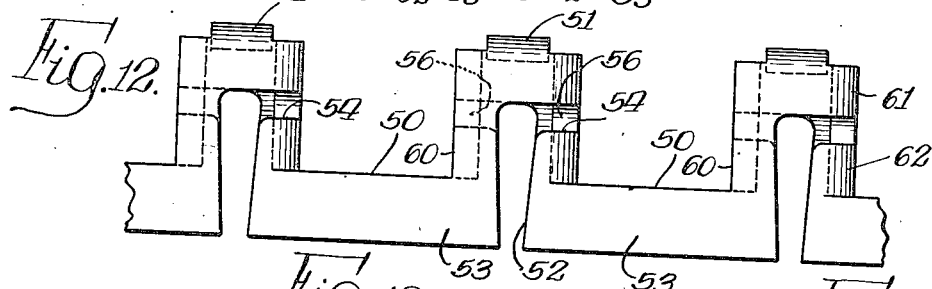
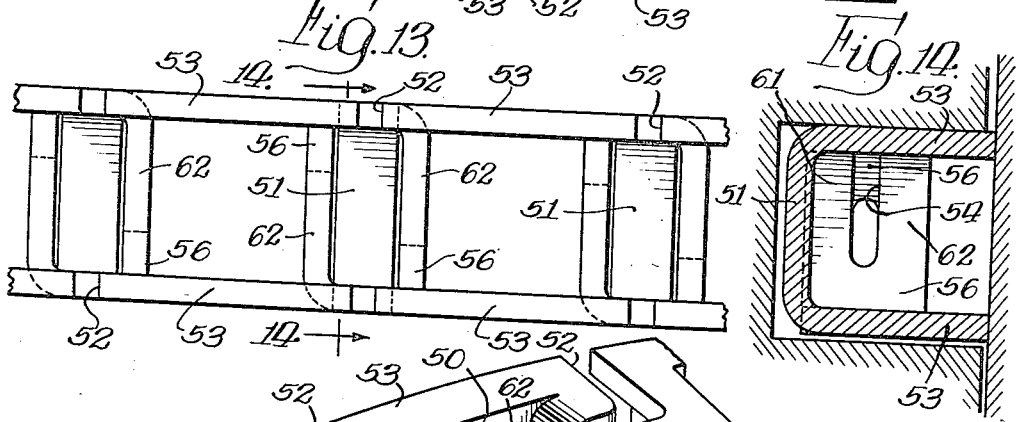
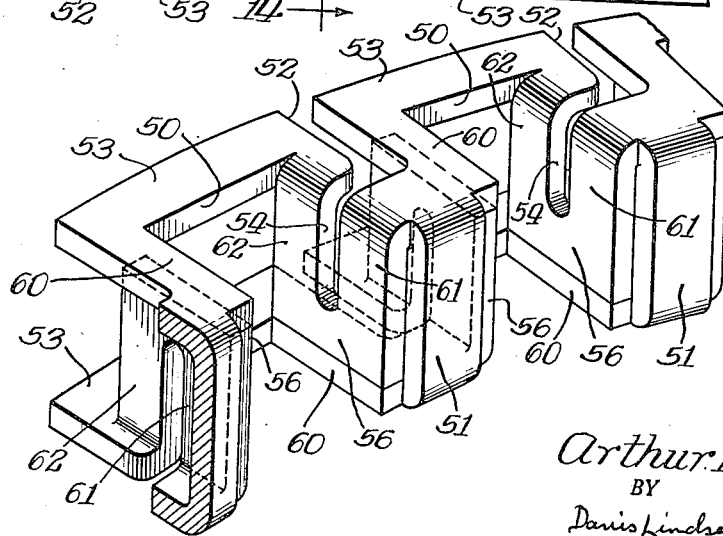
INVENTOR.
Arthur M. Brenneke
BY
Davis Lindsey Hibben & Noyes
Attys.

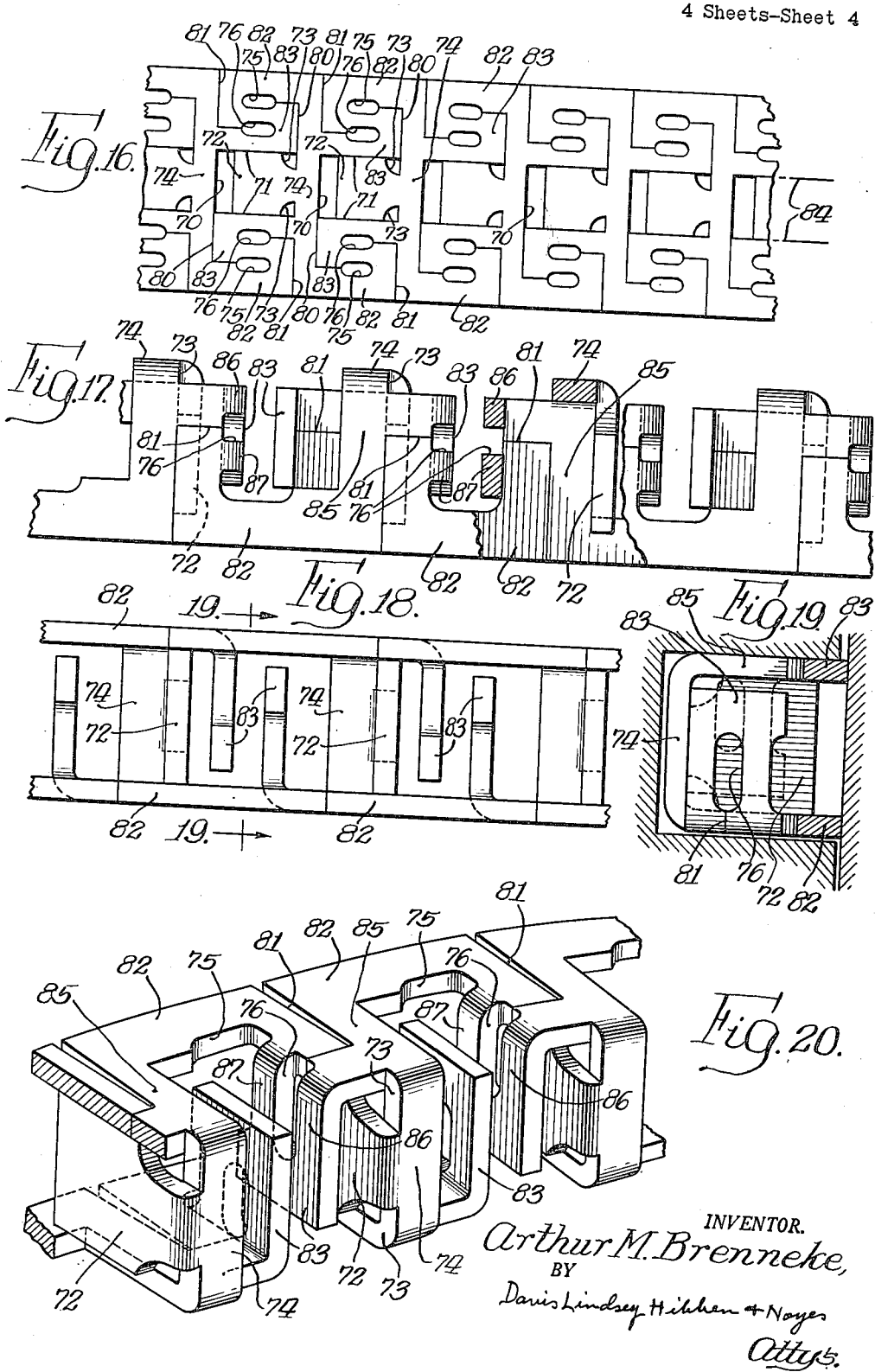

United States Patent Office 2,766,086
Patented Oct. 9, 1956

2,766,086
PISTON RING

Arthur M. Brenneke, Hagerstown, Ind., assignor to Perfect Circle Corporation, Hagerstown, Ind., a corporation of Indiana Application February 23, 1952, Serial No. 273,109

23 Claims. (Cl. 309—45)

The invention relates generally to piston rings and more particularly to rings of the type which are circumferentially expansible.

The general object of the invention is to provide a novel ring of the foregoing character, which is made of sheet metal and which is provided with novel spring means for effecting the circumferential expansion.

Another object is to provide a novel sheet metal piston ring comprising two axially spaced rows of segments, with the segments of one row connected at the inner periphery of the ring to those of the other row and having means which axially supports the segments in properly spaced relation extending outwardly between the two rows of segments.

A further object is to provide a novel sheet metal ring comprising two axially spaced rows of segments with the segments of each row being expansible relative to each other at least to a limited extent independently of the expansion between the segments of the other row.

Other objects and advantages will become apparent from the following description taken in connection with the accompanying drawings, in which:

Fig. 1 is a fragmentary plan view of a strip of metal from which one embodiment of the invention is made.

Fig. 2 is an enlarged fragmentary plan view of the ring made from the strip of Fig. 1 but before it has been given a circular form.

Fig. 3 is a fragmentary elevational view of the outer periphery of the ring.

Fig. 4 is a transverse sectional view taken on the line 4—4 of Fig. 3 and showing the ring in place in a groove in a piston.

Fig. 5 is a fragmentary perspective view of the ring.

Fig. 6 is a fragmentary plan view of a strip of metal from which another embodiment of the invention may be formed.

Fig. 7 is an enlarged fragmentary plan view of the ring made from the strip of Fig. 6 but before it has been given the circular form.

Fig. 8 is a fragmentary elevational view of the outer periphery of this embodiment of the ring.

Fig. 9 is a transverse sectional view taken on the line 9—9 of Fig. 8 and showing the ring positioned in a groove in a piston.

Fig. 10 is a fragmentary perspective view of this form of ring.

Fig. 11 is a fragmentary plan view of a strip for forming still another embodiment of the ring.

Fig. 12 is an enlarged fragmentary plan view of a ring made from the strip of Fig. 11 but before it has been given its circular form.

Fig. 13 is a fragmentary elevational view of the outer periphery of this embodiment of the ring.

Fig. 14 is a transverse sectional view taken on the line 14—14 of Fig. 13 and showing the ring in position in a groove in a piston.

Fig. 15 is a fragmentary perspective view of this embodiment of the ring.

Fig. 16 is a fragmentary plan view of a strip of metal from which still another embodiment of the invention may be made.

Fig. 17 is an enlarged fragmentary plan view of the ring made from the strip of Fig. 16 but before it has been bent in circular form.

Fig. 18 is a fragmentary elevational view of the outer periphery of this embodiment of the ring.

Fig. 19 is a transverse sectional view taken on the line 19—19 of Fig. 18 and showing the ring in position in a groove in a piston.

Fig. 20 is a fragmentary perspective view of this embodiment of the ring.

A ring embodying the features of the invention is of the circumferentially expansible type and is made of sheet metal. Its chief novel feature lies in the spring means tending to expand the ring circumferentially. Thus, the ring comprises two axially spaced rails comprising rows of segments connected by spring means comprising slitted tongues with the portions on the respective sides of the slit of each tongue connected to adjoining segments and adapted to flex perpendicular to the plane of the tongue to provide the desired spring action. In all embodiments, such tongues lie generally in planes which include the axis of the ring, and the tongues are so connected to the segments that the segments in one row are independently expansible relative to the segments of the other row. The tongues may also serve as a means for holding the segments in properly spaced relation to each other axially of the ring, or, if the tongues themselves do not perform this function, then other means constituting a part of the connection between the segments may perform this function.

The embodiment of the invention illustrated in Figs. 1 to 5 is made from a strip of sheet metal punched in the manner shown in Fig. 1. Thus, the strip is provided with a plurality of L-shaped slots 20 which at their outer ends are connected to the edges of the strip by shear lines 21 extending longitudinally of the strip and shear lines 22 extending transversely of the strip. The two edge portions of the strip are thus divided into segments 23 which have overlapping portions at their ends formed by their shear lines 21 and 22. The strip is also provided with longitudinally extending slots 24 on opposite sides of the center line of the strip, and the ends of each pair of slots 24 are connected by a shear line 25 extending transversely of the strip. The slots 24 and the shear line 25 thus form a tongue 26 which is slitted along two lines by the portions 27 of the L-shaped slots 20. The slots 20 and the shear line 25 also form transversely extending web members 30 each connected to the tongue 26 by a central portion 31.

The strip of metal after being punched in the manner just described, as shown in Fig. 1, is then bent into a channel shape form along lines of bending indicated at 32 in Fig. 1 and extending longitudinally of the strip. Such bending gives the strip a U shape form in transverse cross section with the segments 23 formed at one of the edges of the strip being positioned opposite the segments formed from the other edge of the strip. The segments in one edge of the strip are connected with the opposite segments in the other row by means of the web members 30.

To provide for the circumferential expansion and contraction of the ring, the tongues 26 are bent so that the planes thereof extend radially and axially and thus include the axis of the ring when the strip is given its circular form. To this end, the tongues are bent outwardly of the ring to extend between the two rows of segments. The tongues are of such width that the side edges of the tongues contact the faces of the segments to hold them in properly spaced relation axially of the ring. The tongues are of sufficient length so that they extend outwardly beyond the shears 21 and thus engage the overlapping portions of the segments formed by the shears 21 and 22.

The spring action which tends to expand the ring circumferentially is attained by the portions 27 of the slots 20 extending into the tongues to provide slits therein. Thus, each tongue 26 is connected by its central portion 31 to a web member 30 connecting a pair of segments. The tongue 26 is also connected to segments adjoining said pair by the portions, indicated at 33, lying between and formed by the slots 24 and 27. Thus, the portions 33 are free to flex relative to the portion 31 in a direction circumferentially of the ring and transversely or perpendicularly to the plane of the tongue 26 to effect circumferential expansion and contraction. Each portion 33 is free to flex relative to the portion 31 independently of the portion 33 on the opposite side of the portion 31 so that the segments in one row are expansible independently of the segments in the other row.

The form of ring shown in Figs. 6 to 10 is similar to the form in Figs. 1 to 5, and the strip from which it is made is quite similar in its details, differing only in respect to the shearing adjacent the edges of the strip. Thus, in Fig. 6, I show a strip having L-shape slots 20 with the longitudinally extending portions 27. The strip is also provided with the slots 24 and the shears 25 to form the tongues 26. The web members 30 are formed by the slots 20 and the shears 25 while the intermediate connecting portion 31 for the tongue 26 is formed by the two longitudinally extending portions 27 of the slots 20. The tongues 26 are connected to the adjointing segments by the portions 33 formed between the slot portions 27 and the slots 24.

The shearing extending from the outer ends of the slots 20 to the edges of the strip to divide the strip into segments differs from the shearing shown in Fig. 1. Thus, shear lines 40 extend longitudinally of the strip from the outer ends of the slots 20 and in opposite directions, those at one edge in the same direction as the shears 31 in Fig. 1 and those at the opposite edge in the opposite direction. From the shears 40, transversely extending shears 41 extend to the outer edges of the strip to form segments 42. Since the shear lines 40 extend in opposite directions, the shears 41 at the respective edges are not aligned.

The strip is folded along longitudinal lines of bending and then curved to form a ring, in the same manner as the form shown in Fig. 1. This provides a ring comprising two axially spaced rows of segments 42 with the segments in one row connected with opposite segments in the other row by the web members 30. The tongues 26 are bent outwardly to lie between the two rows of segments, and the width of the tongues is such that their side edges engage the inner faces of the segments in the respective rows, thus supporting the segments in an axial direction. With the shears 40 and 41 placed in the manner heretofore described, the tongues engage the segments in one row (the upper row as shown in Fig. 10) at a point where the segments have their full radial width and the overlapping portions of segments in lower row as shown in Fig. 10. Thus, each tongue supports a pair of segments respectively located in opposite rows. In the completed ring, the gaps provided by the shears 41 in the respective rows of segments are out of alignment.

The spring action in this form of ring is obtained similarly to that obtained in the first form in that the portions 33 of each tongue are free to flex, relative to the portion 31 connecting the tongue with the web member 30, in a direction perpendicularly to the plane of the tongue. Thus, the segments in each row are free to move circumferentially with such flexing movement to vary the gaps between the respective segments provided by the shears 41. With such movement, the overlapping portions of the segments provided by the shears 40 slide against one another. Since each portion 33 of each tongue may flex relative to the portion 31 without a similar flexing movement of the opposite portion 33, the segments in one row may be said to be expansible independently of the segments in the other row.

The form of ring shown in Figs. 11 to 15 differs from the previous two forms considerably in its detail, but is provided with tongues generally similar to the tongues 26 in the two previous forms. While the tongues in the form of ring shown in Figs. 11 to 15 provide the same sort of spring action in that they are slitted and have two portions adapted to flex perpendicularly to the planes of the tongues, the tongues in this instance extend axially rather than radially. Nevertheless, they produce a similar spring action for the ring and permit the segments in the one row to expand independently of the segments in the other row.

To form this ring, a strip of metal is provided and is punched along its longitudinal center line to provide rectangular openings 50, leaving portions 51 between the openings 50, which constitute web members. Along each edge of the strip are inwardly extending slots 52 which provide segments 53 along the two edges of the strip. The slots 52 extend inwardly from the edge of the strip and are L-shaped to provide a longitudinally extending portion 54. The strip is also provided with L-shape shear lines 55 at both sides of the strip, and such L-shape shears together with one side of the rectangular slots 50 provide tongues 56. The tongues 56 are longitudinally slit as a result of the portion 54 of the slots 52.

The strip is folded to form the ring by being bent along longitudinal lines 57 into a channel shape form, and the tongues 56 are then bent to extend axially, as is clearly illustrated in Fig. 15. Thereafter the strip is given a circular form to provide the ring.

With a ring formed in this manner, two axially spaced rows of segments 53 are provided, and each segment at one end has an inwardly extending arm 60 to which the web member 51 is connected. This web member is also connected by a corresponding arm 60 to a segment in the opposite row, but this segment is not in alignment with the first-mentioned segment, but is one of the segments of the next adjoining pair. Each arm 60 is also connected to a tongue 56 by a portion 61 of the latter formed by the slot 54. A similar portion 62 is formed on the opposite side of the slot 54 and such portion 62 is integral with the adjoining segment 53 at its end opposite to the arm 60. By bending the tongues 56 to extend in an axial direction, the end edge of each tongue abuts an arm 60 in the opposite row to assist in holding the segments properly spaced in an axial direction.

With a ring formed in this manner and having tongues described, the ring may expand by flexing the portions 61 and 62 of each tongue relative to each other in a direction generally perpendicular to the plane of the tongue, that is, in a circumferential direction. Since each tongue connects two segments in the same row, the segments in one row are expansible independently of the segments in the other row.

The form of ring shown in Figs. 16 to 20 is similar to the other three forms in that it utilizes slitted tongues to provide for circumferential expansion of the ring. It is particularly similar to the form shown in Figs. 11 to 15 because of the fact that these tongues extend axially. It differs, however, from that form in that the tongues do not provide for support of the two rows of segments axially. In this form, such function is performed by struts extending from the web members.

The strip from which this form of ring is made is illustrated in Fig. 16, and such strip is provided with a plurality of rectangular holes 70 along its center line, the holes 70 extending transversely of the strip. At the ends of the holes 70 are shear lines 71 forming portions 72 which eventually function as struts. To facilitate bending the struts 72 in a manner hereinafter described, the righthand end of each strut is narrowed by small punchings 73 connecting with the sheared lines 71. The struts 72 are connected to portions of the strip which provide web members 74.

At each side of the strip are pairs of short longitudinally extending slots 75 and 76. From the slots 76, L shape shear lines 80 extend longitudinally in one direction at one side and in the other direction at the other side of the strip, and thence inwardly to connect with the punchings 73. From the slots 76, L shape shear lines 81 extend longitudinally of the strip and thence outwardly to the edge of the strip to form segments 82 along both edges of the strip. The L shape shear lines 80 with the slots 75 provide tongues 83 which are slitted by virtue of the slots 76.

After the strip is punched in the foregoing manner, it is folded to form a channel shape by bending it along longitudinal lines of bending indicated at 84. The struts 72 are bent to extend outwardly and the tongues are bent to extend in an axial direction. Thus, the tongues located adjacent one edge of the strip are bent to extend upwardly while the tongues adjacent the other end of the strip are bent to extend downwardly. The ring is then given its circular form, which results in the structure shown in Fig. 20.

In this structure, the segments 82 are arranged in two axially spaced rows with the segments arranged in pairs and with the segments of each pair located in the respective rows. Each segment 82 at one end has an inwardly extending arm 85 to which the web member 74 is connected, such web member connecting it to the corresponding arm of a segment in the opposite row of the next adjacent pair. The struts 72 extend outwardly between the segments and have their side edges engaging the faces of the segments to support them in axially spaced relation. Each tongue 83, because of the slot 76, is of slitted form to provide two portions 86 and 87 (see Fig. 20) permitting circumferential expansion of the segments relative to each other. Thus, the portion 86 is connected to the arm 85 of one segment and the portion 87 is connected to the adjoining segment. On expanding or contracting, the portions 86 and 87 flex relative to each other in a direction perpendicularly to the plane of the tongue, that is, circumferentially of the ring, to vary the width of the gaps between the segments provided by the shear lines 81. Since each tongue connects a pair of segments in only one row, the segments in one row are expansible independently of the segments in the other row.

I claim:

1. A piston ring comprising two axially spaced rows of segments, and a plurality of slitted tongues connecting the segments circumferentially of the ring, each tongue comprising a single layer of material lying generally in a plane which includes the axis of the ring.

2. A piston ring comprising a pair of segmental rails with the segments of each rail connected together by slitted tongues, the portions of each tongue formed by the slit being respectively connected to adjoining segments and being bendable in opposite directions relative to the plane of the tongue on change in circumferential length of the ring.

3. A piston ring comprising a pair of segmental rails with the segments of each rail connected together by slitted tongues, each tongue comprising a single layer of material and the plane of each tongue extending generally radially from and longitudinally of the axis of the ring and facing circumferentially.

4. A piston ring comprising a pair of segmental rails with the segments of each rail connected together by slitted tongues and the segments of one rail connected to the segments of the other rail by web members, the portions of each tongue forming the sides of the slit being bendable opositely relative to the plane of the tongue.

5. A piston ring comprising a pair of segmental rails with the segments of each rail connected together by slitted tongues, each tongue facing circumferentially with the portions of the tongue formed by the slit being bendable oppositely in a circumferential direction on expansion and contraction of the ring.

6. A piston ring comprising a pair of axially spaced rails each comprising a plurality of segments, the latter being connected by tongues extending outwardly of the ring and having their side edges respectively engaging opposite segments in the two rails, said tongues having radially extending slits terminating inwardly of the outer edges of the tongues to leave solid portions at said outer edges rigidly supporting the engaged segments.

7. A piston ring comprising two axially spaced rows of segments, and a plurality of spring members connecting the segments, each member having a pair of generally parallel slits forming three generally parallel portions bendable relative to each other on expansion and contraction of the ring, said spring members extending outwardly of the ring between the two rows of segments with the slits terminating inwardly of the outer edges of the members and providing rigid portions at said outer edges supporting the segments.

8. A piston ring comprising two axially spaced rows of segments, and a plurality of spring members connecting the segments, each having a pair of slits forming three relatively bendable portions, the outer two portions being respectively connected to segments in the two rows and the middle portion being connected to circumferentially adjoining segments.

9. A piston ring comprising two axially spaced rows of segments, and a plurality of spring members connecting the segments, each member comprising three relatively bendable portions integrally connected to each other at one end with the free ends of two of the portions respectively connected to segments in the two rows and the third portion connected to circumferentially adjoining segments.

10. A piston ring comprising two axially spaced rows of segments, web members connecting the segments in one row with those in the other row, and spring members each comprising three relatively bendable portions respectively connected to segments in the two rows and to one of said web members.

11. A piston ring comprising upper and lower rows of segments, web members connecting the segments in one row with those in the other row, and a plurality of slitted tongues extending outwardly between the two rows and supporting them in axially spaced relation, the slitting of each tongue providing relatively bendable portions connected to segments in the two rows and to one of said web members.

12. A piston ring comprising a plurality of U-shaped sections, each comprising a pair of axially spaced segments and a connecting web member, and a plurality of tongues each having relatively bendable portions connecting two sections with each other and connecting the pair of segments of one of said two sections.

13. A piston ring comprising two axially spaced rows of segments, and a plurality of slitted tongues extending axially and facing circumferentially of the ring and circumferentially connecting adjoining segments, the portions of each tongue forming the sides of the slit being relatively bendable oppositely in a circumferential direction to provide for expansion and contraction.

14. A piston ring comprising two axially spaced rows of segments, and a plurality of slitted tongues arranged in pairs with one tongue of each pair connecting adjoining segments in one row and the other tongue of each pair connecting adjoining segments in the other row, the adjoining segments in one row being positioned opposite the adjoining segments in the other row, the portions of each tongue formed by the slit being bendable in opposite directions relative to the plane of the tongue on change in circumferential length of the ring.

15. A piston ring comprising two axially spaced rows of segments, a series of slitted tongues each connecting a pair of segments in one row at their adjoining ends, a second series of slitted tongues each connecting a pair of segments in the other row at their adjoining ends, and web members connecting the segments in one row with those in the other row, each web member being located between a tongue connecting one pair of segments in one row and the tongue connecting the opposite pair of segments in the other row, the portions of each tongue formed by the slit being bendable in opposite directions relative to the plane of the tongue on change in circumferential length of the ring.

16. A piston ring comprising two axially spaced rows of segments, each segment having inwardly extending arms at its ends, and two series of slitted tongues, the tongues of one series connecting adjoining arms of the segments in one row and the tongues of the other series connecting adjoining arms of the segments of the other row, the portions of each tongue formed by the slit being bendable in opposite directions relative to the plane of the tongue on change in circumferential length of the ring.

17. A piston ring comprising two axially spaced rows of segments, each segment having inwardly extending arms at its ends, a circumferentially facing slitted tongue connecting each arm of each segment with the adjacent arm of the adjoining segment, and a web member connecting each segment with a segment in the opposite row.

18. A piston ring comprising two axially spaced rows of segments, and two series of slitted tongues, one series connecting the segments in one row and the other series connecting the segments in the other row, the tongues of one series extending axially in one direction and the tongues of the other series extending axially in the opposite direction, and the tongues of both series facing circumferentially with the portions of each tongue formed by the slit being bendable oppositely in a circumferential direction on expansion and contraction of the ring.

19. A piston ring comprising two axially spaced rows of segments, and a plurality of slitted tongues circumferentially connecting the segments in each row, the segments in each row having portions overlapping each other along circumferentially extending lines, and the tongues extending outwardly and intersecting said lines and engaging the overlapping portions of the segments in the two rows, the slits in the tongues being spaced from the outer edges of the tongues to provide solid outer portions on the tongues rigidly supporting the segments.

20. A piston ring comprising two axially spaced rows of segments, adjoining segments in each row having overlapping portions, and a plurality of slitted tongues circumferentially connecting the segments in each row, the tongues extending outwardly between the segments with the edges of each tongue engaging a segment in one row intermediate the ends of the latter and engaging overlapping portions of adjoining segments in the opposite row, the portions of each tongue forming the sides of the slit being bendable oppositely relative to the plane of the tongue.

21. A piston ring comprising two axially spaced rows of segments, each segment having at one end an inwardly extending arm connected by a web member with the arm of a segment in the opposite row, each segment at its opposite end having a slitted tongue connecting it with the adjoining segment.

22. A piston ring comprising two axially spaced rows of segments, each segment having at one end an inwardly extending arm connected by a web member with the arm of a segment in the opposite row, each segment at its opposite end having a slitted tongue extending axially with its end edge seated against an arm of one of the segments in the opposite row, the portions of each tongue forming the sides of the slit being bendable oppositely relative to the plane of the tongue.

23. A piston ring comprising two axially spaced rows of segments, each segment having at one end an inwardly extending arm connected by a web member with the arm of a segment in the opposite row, each segment at its opposite end having a slitted tongue connecting it with the adjoining segment, and struts connected to the web members and extending outwardly between the segments and supporting them in axially spaced relation, the portions of each tongue forming the sides of the slit being bendable oppositely relative to the plane of the tongue.

References Cited in the file of this patent

UNITED STATES PATENTS

| | | |
|---|---|---|
| 2,224,338 | Bowers | Dec. 10, 1940 |
| 2,273,691 | Bowers | Feb. 17, 1942 |
| 2,290,321 | Engelhardt | July 21, 1942 |
| 2,311,731 | Bowers | Feb. 23, 1943 |
| 2,345,589 | Engelhardt | Apr. 4, 1944 |
| 2,432,602 | Zahodiakin | Dec. 16, 1947 |
| 2,463,802 | Phillips | Mar. 8, 1949 |
| 2,482,990 | Olson | Sept. 27, 1949 |
| 2,602,715 | Shirk | July 8, 1952 |